United States Patent
Yu et al.

(10) Patent No.: US 11,823,567 B2
(45) Date of Patent: Nov. 21, 2023

(54) TRAFFIC MONITORING USING OPTICAL SENSORS

(71) Applicant: Palo Alto Research Center Incorporated, Palo Alto, CA (US)

(72) Inventors: Hong Yu, Fremont, CA (US); Qiushu Chen, San Jose, CA (US); Peter Kiesel, Palo Alto, CA (US); Ajay Raghavan, Mountain View, CA (US); Jin Yan, Palo Alto, CA (US); Kyle Arakaki, Mountain View, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/393,986

(22) Filed: Aug. 4, 2021

(65) Prior Publication Data
US 2023/0039117 A1    Feb. 9, 2023

(51) Int. Cl.
| G08G 1/01 | (2006.01) |
| E01F 11/00 | (2006.01) |
| G01D 5/353 | (2006.01) |

(52) U.S. Cl.
CPC ............ *G08G 1/0116* (2013.01); *E01F 11/00* (2013.01); *G01D 5/353* (2013.01)

(58) Field of Classification Search
CPC ......... G08G 1/04; G08G 1/0116; G01D 5/353
USPC ....................................................... 340/935
See application file for complete search history.

(56) References Cited

U.S. PATENT DOCUMENTS

| 4,554,724 A | 11/1985 | Bantz |
| 6,807,355 B2 | 10/2004 | Dofher |
| 7,095,930 B2 | 8/2006 | Storaasil et al. |
| 8,990,032 B2 * | 3/2015 | Bajwa ............... G08G 1/015 702/56 |
| 9,062,423 B2 | 6/2015 | Allouche et al. |
| 9,208,681 B2 * | 12/2015 | Borton ............... G08G 1/02 |
| 9,353,887 B2 | 5/2016 | Konczak |
| 10,697,804 B2 | 6/2020 | Freeland et al. |
| 11,466,428 B1 | 10/2022 | Pino |
| 2002/0061231 A1 | 5/2002 | Finzel et al. |

(Continued)

FOREIGN PATENT DOCUMENTS

| CN | 111521248 A | 8/2020 |
| WO | WO 02/065182 A2 | 2/2005 |
| WO | WO 2018/222541 A1 | 12/2018 |

OTHER PUBLICATIONS

European Patent Application No. 22185969.7; Office Action dated Dec. 21, 2022, 9 pages.

(Continued)

*Primary Examiner* — Qutbuddin Ghulamali
(74) *Attorney, Agent, or Firm* — Mueting Raasch Group

(57) ABSTRACT

A system includes a sensor network comprising at least two optical fibers coupled to a pavement. Each optical fiber includes one or more optical sensors installed a predetermined distance from one or more adjacent optical fibers. The one or more optical sensors are configured to produce a wavelength shift signal. A processor is configured to determine one or both of one or more attributes of one or more objects travelling on the pavement and a traffic condition of the pavement based on the wavelength shift signal. A transmitter is configured to transmit the one or more attributes to a predetermined location.

20 Claims, 15 Drawing Sheets

(56) References Cited

U.S. PATENT DOCUMENTS

| | | |
|---|---|---|
| 2002/0140924 A1* | 10/2002 | Wangler .............. G01S 7/4802 |
| | | 356/28 |
| 2003/0127587 A1* | 7/2003 | Udd .................... G01L 1/246 |
| | | 250/227.14 |
| 2004/0067004 A1 | 4/2004 | Hill et al. |
| 2004/0115004 A1 | 6/2004 | Serrano |
| 2004/0165957 A1 | 8/2004 | Serrano et al. |
| 2010/0303404 A1 | 12/2010 | Fischer |
| 2013/0011198 A1 | 1/2013 | Pichler et al. |
| 2013/0220708 A1* | 8/2013 | Kim .................. G01G 23/3735 |
| | | 177/3 |
| 2013/0223807 A1 | 8/2013 | Elford et al. |
| 2014/0277897 A1 | 9/2014 | Saiz |
| 2019/0137305 A1* | 5/2019 | Karabacak ............ G01D 5/353 |
| 2019/0206240 A1* | 7/2019 | Gonçalves ............ G01G 3/125 |
| 2019/0317293 A1 | 10/2019 | Cox et al. |
| 2020/0166390 A1 | 5/2020 | Ainger et al. |

OTHER PUBLICATIONS

European Patent Application No. 22186447.3; Office Action dated Dec. 22, 2022, 10 pages.

Fajkus et al., "PDMS-FBG-Based Fiber Optic System for Traffic Monitoring in Urban Areas," Jul. 3, 2020, *IEEE Access*, 8: 127648-127658.

* cited by examiner

TRAFFIC MONITORING USING OPTICAL SENSORS

TECHNICAL FIELD

This application relates generally to techniques for traffic monitoring. The application also relates to components, devices, systems, and methods pertaining to such techniques.

BACKGROUND

Fiber optic (FO) sensors can be used for detecting parameters such as strain, temperature, pressure, current, voltage, chemical composition, and vibration. FO sensors are attractive components because they are thin, lightweight, sensitive, robust to harsh environments, and immune to electromagnetic interference (EMI) and electrostatic discharge. FO sensors can be arranged to simultaneously measure multiple parameters distributed in space with high sensitivity in multiplexed configurations over long optical fiber cables. One example of how this can be achieved is through fiber Bragg grating (FBG) sensors. A FBG sensor is formed by a periodic modulation of the refractive index along a finite length (typically a few mm) of the core of an optical fiber. This pattern reflects a wavelength, called the Bragg wavelength, determined by the periodicity of the refractive index profile. The Bragg wavelength is sensitive to external stimulus (strain and/or temperature, etc.) that changes the periodicity of the grating and/or the index of refraction of the fiber. Thus, FBG sensors rely on the detection of small wavelength changes in response to stimuli of interest. In some implementations, FO sensors can be installed on and/or under pavement, for example, and operated to detect parameters, e.g., strain, temperature, vibration, related to vehicles traveling on the road.

SUMMARY

Embodiments described herein involve system, comprising a sensor network comprising at least two optical fibers coupled to a pavement. Each optical fiber comprises one or more optical sensors installed a predetermined distance from one or more adjacent optical fibers. The one or more optical sensors are configured to produce a wavelength shift signal. A processor is configured to determine one or both of one or more attributes of one or more objects travelling on the pavement and a traffic condition of the pavement based on the wavelength shift signal. A transmitter is configured to transmit the one or more attributes to a predetermined location.

A method involves receiving a wavelength shift signal from a plurality of optical sensors coupled to a pavement. The plurality of optical sensors are disposed on at least two optical fibers. Each optical fiber is disposed a predetermined distance from at least one other optical fiber. One or both of one or more attributes of one or more objects travelling on the pavement and a traffic condition are determined based on the wavelength shift signal. One or both of the one or more attributes and the traffic condition are transferred to a predetermined location.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
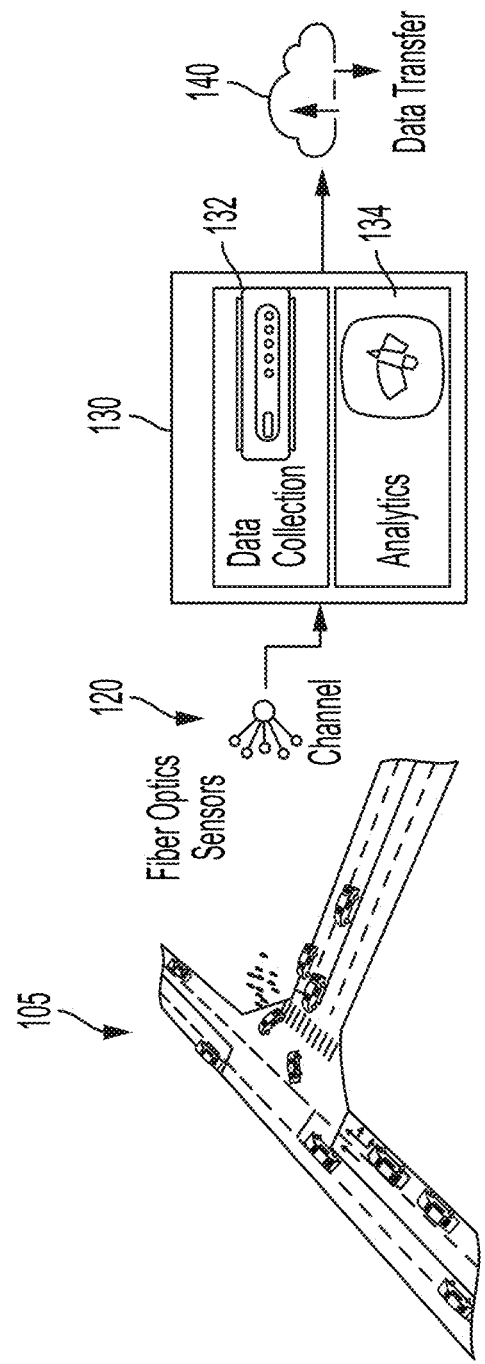
FIG. 1A illustrates a diagram of an FO traffic monitoring system in accordance with embodiments described herein.

Embodiments described herein may involve a traffic monitoring system that is capable of extracting traffic parameters, including characteristics of vehicles and their movement on the road. Extracting these traffic parameters may allow for better traffic management and pavement maintenance/design, which will help to mitigate traffic congestion problems, prevent catastrophic failure due to poor road conditions, and/or improve the life quality of citizens.

Embodiments described herein a system for accurate monitoring of traffic and/or identifying vehicles that can be used in an intelligent traffic management and planning system. Embodiments herein describe a system and methods for integrated traffic monitoring (e.g., traffic volume, speed, and/or road occupancy) and vehicle attributes extraction (e.g., number of axles, axle groups, vehicle type, an/or axle weight) using distributed fiber optics (FO) sensors embedded in pavement.

Embodiments described herein may include one or more of 1) being capable of monitoring multiple parameters, 2) being highly accurate, 3) being robust under various field and/or weather conditions, 4) having a low installation and/or maintenance cost, and 5) having a low down time. Embodiments herein may involve hardware of a traffic monitoring system based on optical sensors. According to various configurations, the sensors may be fiber Bragg grating (FBG) strain sensors, Fabry Perot sensors, and/or other interferometric optical sensors. In some cases, the sensors may include one or more of electrical and/or resistive sensors, mechanical sensors, and/or other types of strain gages. In some cases, a combination of different types of sensors may be used.

The sensors described herein are generally described as fibers inscribed with FBG arrays as the sensing element for traffic monitoring. FBGs are wavelength-specific narrow-band reflectors formed in the core of standard fibers by introducing a periodic variation in the refractive index (RI) of the fiber core. Several factors, including temperature and strain, that change the RI variation will shift the reflection wavelength of an FBG and thus be sensed by the FBG. While many embodiments described herein use FBGs as an example, it is to be understood that any suitable types of sensors may be used. Detailed considerations for FBG array design for the specific use case are discussed. The proposed fiber optic (FO)-based sensing system has several unique characteristics. For example, the sensing system may be substantially immune to electro-magnetic interference. The allows for less frequent system maintenance and/or calibration, which may be useful for reliable long-term deployment in the field. The proposed system may be independent of visibility condition at the site. The proposed system may be capable of self-calibration of temperature.

The proposed scheme may be capable of monitoring multiple parameters, including one or more of weight-in-motion, speed, axle count, and vehicle class with high accuracy and high dynamic range. The proposed scheme can provide higher spatial resolution of vehicles on the lane, being able to detect a lane-changing event and/or a lane straddling event.

Various embodiments show installation strategies to incorporate fibers substantially permanently into the pavement. Though this is invasive installation with introduction of certain amount of material into the pavement, the proposed FBG-based FO sensing system is supposed to facilitate standardized installation procedure, have potential for high level of multiplexing, have a longer lifetime, and be compatible with the mature mass production of FBG FO sensors, which makes this invention more competent and cost-effective for large scale deployment for multi-parameter traffic monitoring.

Embodiments described herein involve fibers with FBG array inscribed are embedded into pavement to sense objects (e.g., vehicles and/or pedestrians) moving on the pavement above. FIG. 1A illustrates a diagram of an FO traffic monitoring system in accordance with embodiments described herein. Vehicles traveling in the sensing region 105 may induce pavement deformation, which may cause strain on the pavement-embedded sensors 120 and produce an FBG wavelength shift signal. Fibers are connected to an FBG interrogator at one end, where the center wavelength of each FBG on the fiber is tracked at a desired frequency. The center wavelengths of FBGs can be streamed to a processor 130 having a data collection module 132 and an analytics module 134 where the information is translated into traffic parameters. The traffic parameters may include one or more of vehicle speed, a traffic volume, a number of axles of at least one vehicle on the road, a vehicle classification of the at least one vehicle on the road, vehicle location in a lane, a vehicle weight, and a weight per axle of the at least one vehicle on the road, for example. The extracted information can then be transferred to a predetermined location via a transmitter 140. For example, the extracted information may be transferred to the cloud, enabling a remote-control center to use the information for traffic and/or road condition management. In some embodiments, the information translation can happen after the raw sensing data are transferred to the cloud.

Typically, there are multiple FBG sensors on one fiber. The center wavelength of each FBG's reflection band distributes in a certain wavelength range. For example, the wavelength range can be from 1510 nm-1590 nm. In one embodiment, the reflection wavelength of each FBG on the same fiber has certain spacing in the spectrum. For example, the spectral spacing of FBGs on the same fiber can be ~2-3 nm. In the wavelength range 1510-1590 nm, a 3 nm spacing will allow ~26 FBGs on one fiber to be interrogated simultaneously. In another embodiment, FBGs on the same fiber can have overlapped reflection bands and signals from different FBGs are distinguished by additional time domain features (e.g., reflection time). In general, the sensing fiber design for this application needs to consider the level of multiplexing needed and trade-off between system performance (sampling rate, wavelength accuracy, etc.) and overall cost (hardware, installation, maintenance, etc.)

Figure 1B:
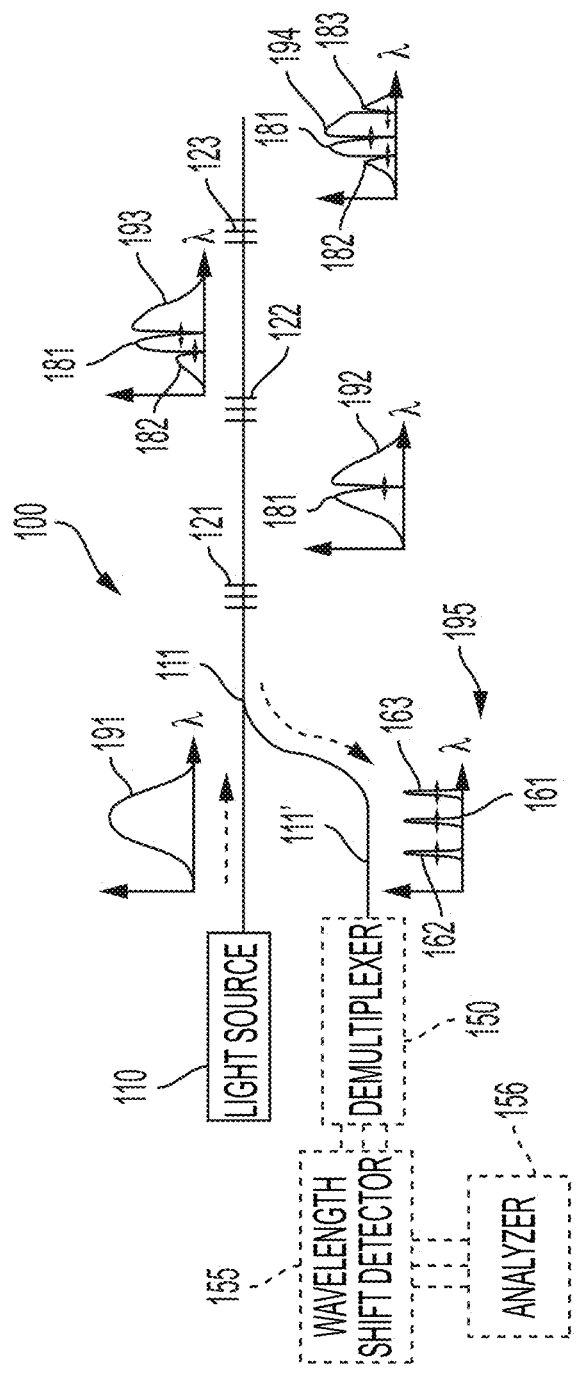
FIG. 1B shows a wavelength multiplexed system can use a compensated sensor array comprising multiple FBG sensors disposed on a single optical fiber in accordance with embodiments described herein.

FO sensors can simultaneously measure multiple parameters distributed in space with high sensitivity in multiplexed configurations over long FO cables. One example of how this can be achieved is through fiber Bragg grating (FBG) sensors. FIG. 1B shows a wavelength multiplexed system 100 can use a compensated sensor array comprising multiple FBG sensors 121, 122, 123 disposed on a single optical fiber 111. The sensors 121-123 may be arranged to sense parameters including one or more of temperature, strain, and/or vibration, for example. As indicated in FIG. 1B, input light is provided by the light source 110, which may comprise or be a light emitting diode (LED) or superluminescent laser diode (SLD), for example. The spectral characteristic (intensity vs. wavelength) of broadband light is shown by inset graph 191. The intensity is highest near the middle of the spectrum and falls off at the spectrum edges. The sensors 121, 122, 123 include compensation, e.g., one or more of different reflectivities and different attenuations, that decreases the difference in the intensity of the output signal light reflected by the sensors to compensate for the input light that is non-uniform in intensity, e.g., due to spectral non-uniformity of the light source and/or scattering losses in the optical fiber. The input light is transmitted via the optical fiber (FO) cable 111 to the first FBG sensor 121. The first FBG sensor 121 reflects a portion of the light in a first wavelength band having a central wavelength, $\lambda 1$. Light having wavelengths other than within the first wavelength band is transmitted through the first FBG sensor 121 to the second FBG sensor 122. The spectral characteristic of the light transmitted to the second FBG sensor 122 is shown in inset graph 192 and exhibits a notch 181 at the first wavelength band centered at $\lambda 1$ indicating that light in this wavelength band is reflected by the first sensor 121.

The second FBG sensor 122 reflects a portion of the light in a second wavelength band having a central wavelength, $\lambda 2$. Light that is not reflected by the second FBG sensor 122 is transmitted through the second FBG sensor 122 to the third FBG sensor 123. The spectral characteristic of the light transmitted to the third FBG sensor 123 is shown in inset graph 193 and includes notches 181, 182 centered at $\lambda 1$ and $\lambda 2$.

The third FBG sensor 123 reflects a portion of the light in a third wavelength band having a central or peak wavelength, $\lambda 3$. Light that is not reflected by the third FBG sensor 123 is transmitted through the third FBG sensor 123. The spectral characteristic of the light transmitted through the third FBG sensor 123 is shown in inset graph 194 and includes notches 181, 182, 183 centered at λ1, λ2, and λ3.

Light in wavelength bands 161, 162, 163, having central wavelengths λ1, λ2 and λ3 (illustrated in inset graph 195) is reflected by the first, second, or third FBG sensors 121, 122, 123, respectively, along the FO cables 111 and 111' to an the optical wavelength demultiplexer 150. Compensating input characteristics of sensors 121, 122, 123 cause the difference in the intensity peaks of the light 161, 162, 163 to be reduced when compared to the intensity peaks from an uncompensated sensor array.

From the wavelength demultiplexer 150, the sensor light 161, 162, 163 may be routed to a wavelength shift detector 155 that generates an electrical signal responsive to shifts in the central wavelengths λ1, λ2 and λ3 and/or wavelength bands of the sensor light. The wavelength shift detector 155 receives reflected light from each of the sensors and generates corresponding electrical signals in response to the shifts in the central wavelengths λ1, λ2 and λ3 or wavelength bands of the light reflected by the sensors 121-123. The analyzer 156 may compare the shifts to a characteristic base wavelength (a known wavelength) to determine whether changes in the values of the parameters sensed by the sensors 121-123 have occurred. The analyzer 156 may determine that the values of one or more of the sensed parameters have changed based on the wavelength shift analysis and may calculate a relative or absolute measurement of the change.

In some cases, instead of emitting broadband light, the light source may scan through a wavelength range, emitting light in narrow wavelength bands to which the various sensors disposed on the FO cable are sensitive. The reflected light is sensed during a number of sensing periods that are timed relative to the emission of the narrowband light. For example, consider the scenario where sensors 1, 2, and 3 are disposed on a FO cable. Sensor 1 is sensitive to a wavelength band (WB1), sensor 2 is sensitive to wavelength band WB2, and sensor 3 is sensitive to WB3. The light source may be controlled to emit light having WB1 during time period 1 and sense reflected light during time period 1a that overlaps time period 1. Following time period 1a, the light source may emit light having WB2 during time period 2 and sense reflected light during time period 2a that overlaps time period 2. Following time period 2a, the light source may emit light having WB3 during time period 3 and sense reflected light during time period 3a that overlaps time period 3. Using this version of time domain multiplexing, each of the sensors may be interrogated during discrete time periods. When the intensity of the narrowband light sources varies, a compensated sensor array as discussed herein may be useful to compensate for the intensity variation of the sources.

The FO cable may comprise a single mode (SM) FO cable or may comprise a multi-mode (MM) FO cable. While single mode fiber optic cables offer signals that are easier to interpret, to achieve broader applicability and lower costs of fabrication, multi-mode fibers may be used. MM fibers may be made of plastic rather than silica, which is typically used for SM fibers. Plastic fibers may have smaller turn radii when compared with the turn radii of silica fibers. This can offer the possibility of curved or flexible configurations, for example. Furthermore, MM fibers can work with less expensive light sources (e.g., LEDs) as opposed to SM fibers that may need more precise alignment with superluminescent diodes (SLDs). Therefore, sensing systems based on optical sensors in MM fibers may yield lower cost systems.

Figure 2A:
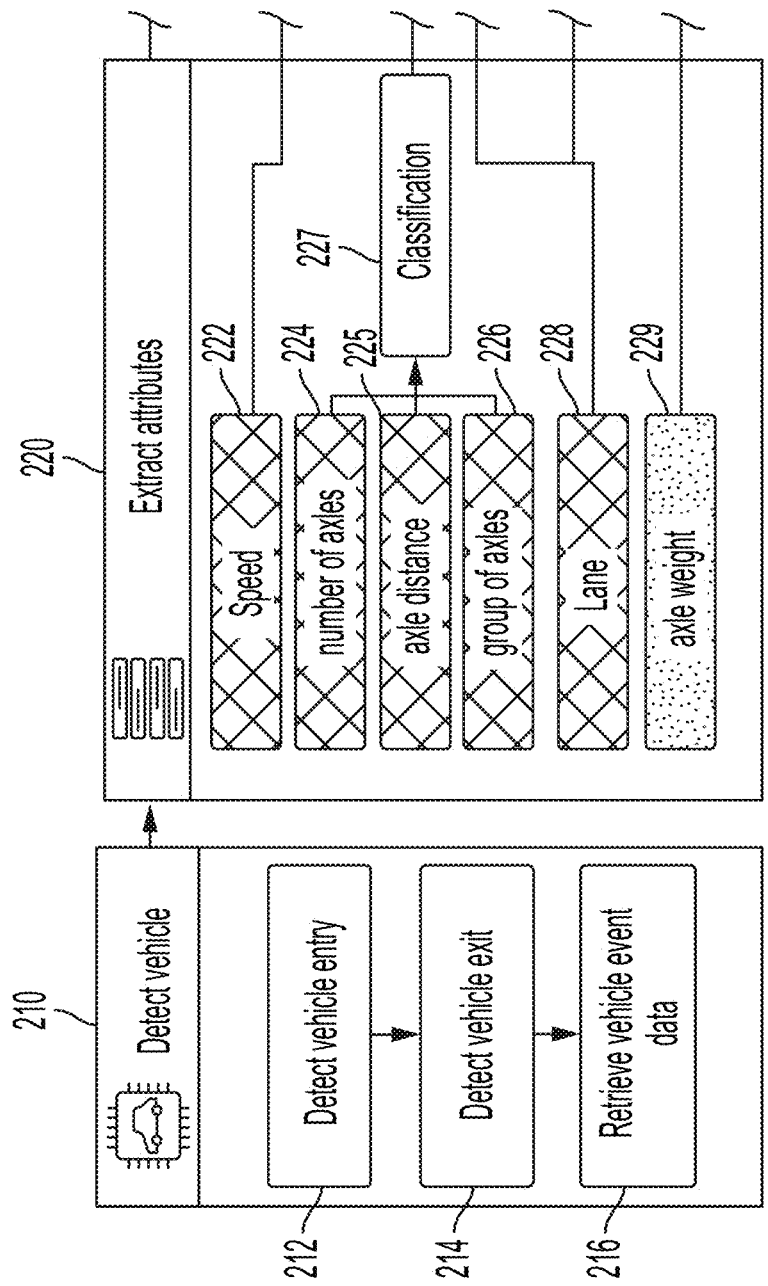
FIGS. 2A and 2B show more detailed views of the analytics module in accordance with embodiments described herein.
Figure 2B:
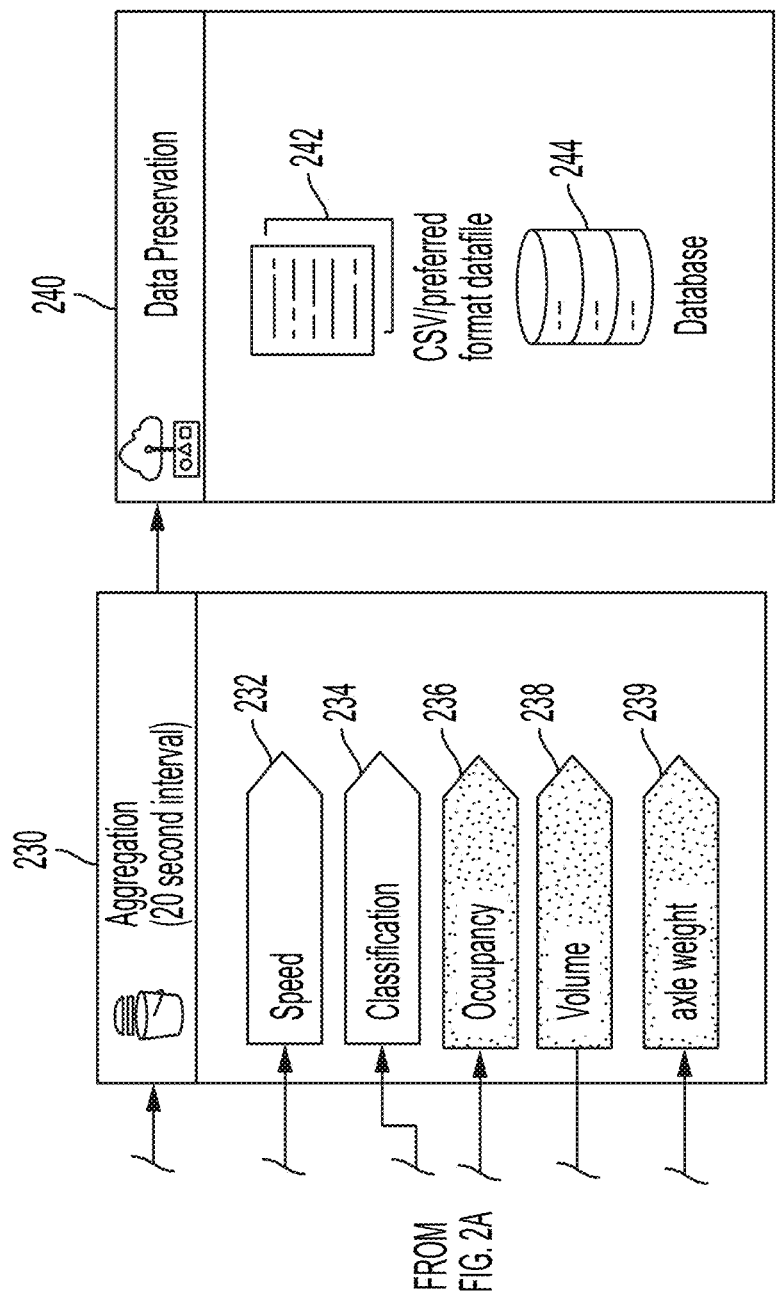

FIG. 2 shows a more detailed view of the analytics module 130 in accordance with embodiments described herein. A vehicle detection module 210 may be configured to detect vehicle entry 212. Detecting vehicle entry may include determining a time at which a vehicle enters a sensing zone (e.g., in a location between two adjacent optical fibers). For example, detecting vehicle entry may involve detecting when a vehicle first crosses over an embedded FO sensor. Similarly, the vehicle detection module 210 may be configured to detect vehicle exit 214. Detecting vehicle exit may include determining a time at which a vehicle exits a sensing zone. For example, detecting vehicle exit may involve detecting when a last axle of a vehicle crosses over an embedded FO sensor and/or exits the sensing zone comprising one or more embedded FO sensors. Vehicle event data may be retrieved 216 based on the sensor data.

An attribute extraction module 220 may be configured to extract various traffic attributes and/or vehicle attributes in accordance with embodiments described herein. The attributes may include one or more of speed 222, number of axles 224, distance between axles 225, group of axles 226, what lane the vehicle is travelling in 228, a weight per axle 229, and/or a vehicle classification 227 for a predetermined jurisdiction. Other types of attributes may also be extracted. For example, a direction of travel of a vehicle may be extracted.

The attributes may be aggregated 230 to determine other characteristics about the vehicles and/or traffic travelling on the road. The aggregated attributes may include information about multiple vehicles within a predetermined time period (e.g., 20 seconds). According to various embodiments, the attributes of more than one vehicle may be aggregated to determine one or more of aggregated speed 232, classification 234, and axle weight 239. In some cases, the attributes may be aggregated to determine one or more of occupancy 236 and/or a volume of vehicles travelling on the road 238. The aggregated traffic speeds may be used to understand traffic bottlenecks, for example. Vehicle classification and/or axle weight data may be used to understand road wear and/or usage patterns from aggregated data, for example. One or more of raw data, attribute data, and/or aggregated data may be stored 240 in a database 244 and/or in a preferred data file 242 (e.g., CSV).

Figure 3A:
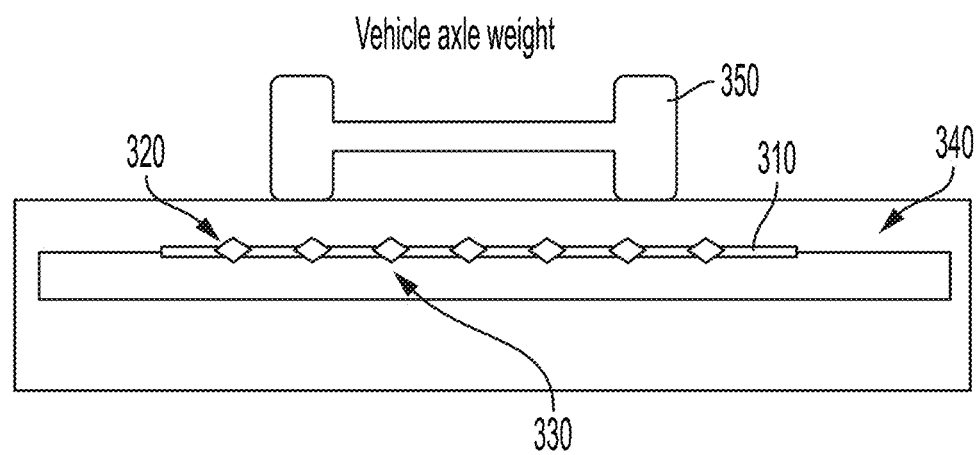
FIGS. 3A and 3B illustrates an example of a sensing system for monitoring traffic and/or vehicle parameters in accordance with embodiments described herein.
Figure 3B:
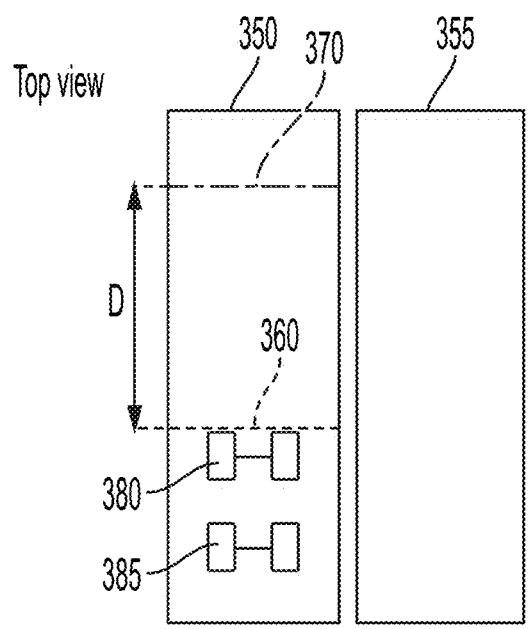

FIGS. 3A and 3B illustrates an example of a sensing system for monitoring traffic and/or vehicle parameters in accordance with embodiments described herein. Two optical fibers 360, 370 are installed substantially parallel to each other. In some cases, the optical fibers are installed in a configuration where at least two of the optical fibers are not installed substantially parallel to each other. Each optical fiber 360, 370 has a plurality of FO sensors 320 are installed substantially perpendicular to the direction of traffic. For example, the second optical fiber 370 may be installed a predetermined distance, D, from the first optical fiber 360. D may be in a range of about 0.5 m to about 5 m. In some cases, D is in a range of about 1 m to about 3 m.

In some cases, the optical fibers 360, 370 may be supported in the pavement by a support bar and/or a support structure 330 in the road pavement 340. According to various embodiments, the optical fibers may be installed in trenches within or underneath the pavement. Some embodiments for installing optical fibers are described in more detail in U.S. patent application Ser. No. 17/393,927, which is incorporated by reference in its entirety. According to various embodiments, there may be more than two optical fibers and/or the optical fibers may be installed in a configuration other than perpendicular to the direction of traffic. While FIGS. 3A and 3B show the optical fiber installed on and/or under two lanes 350, 355, it is to be understood that the optical fiber may be installed on and/or under any number of lanes.

Figure 3C:
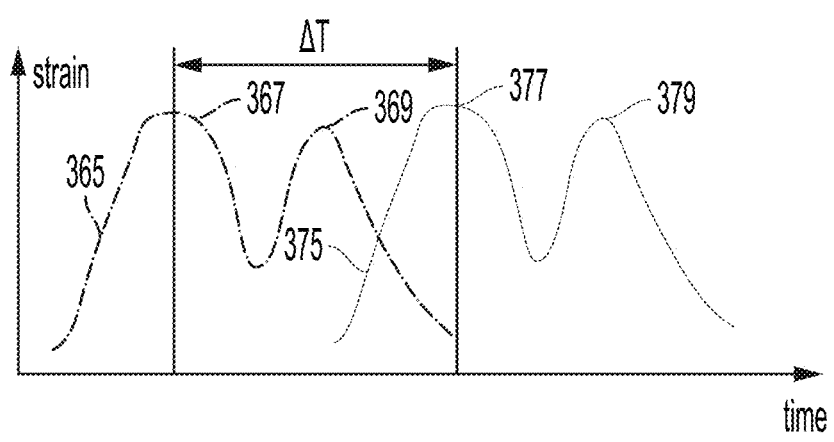
FIG. 3C shows the stimulated strain in pavement that can be captured by the sensors in accordance with embodiments described herein.

When an axle 380, 385 of a vehicle passes the sensors, the stimulated strain in pavement can be captured by the sensors as shown in FIG. 3C. A first curve 365 represents the vehicle axles 380, 385 passing over the first optical fiber 360. The peaks 367, 369 represent the first axle 380 and the second axle 385 passing over the first optical fiber 360, respectively. Similarly, a second curve 375 represents the vehicle axles 380, 385 passing over the second optical fiber 370. The peaks 377, 379 represent the first axle 380 and the second axle 385 passing over the second optical fiber 370, respectively.

Vehicle and traffic attributes can then be inferred from the temporal-spatial sensor data. For example, a simple vehicle speed estimate may be determined by calculating the time it takes for the first axle 380 to travel from the first optical fiber 360 to the second optical fiber ($\Delta t$). Since the distance between the two fiber lines are known (D), vehicle speed can be simply calculated as shown in (1).

$$v = D/\Delta t \quad (1)$$

Figure 4:
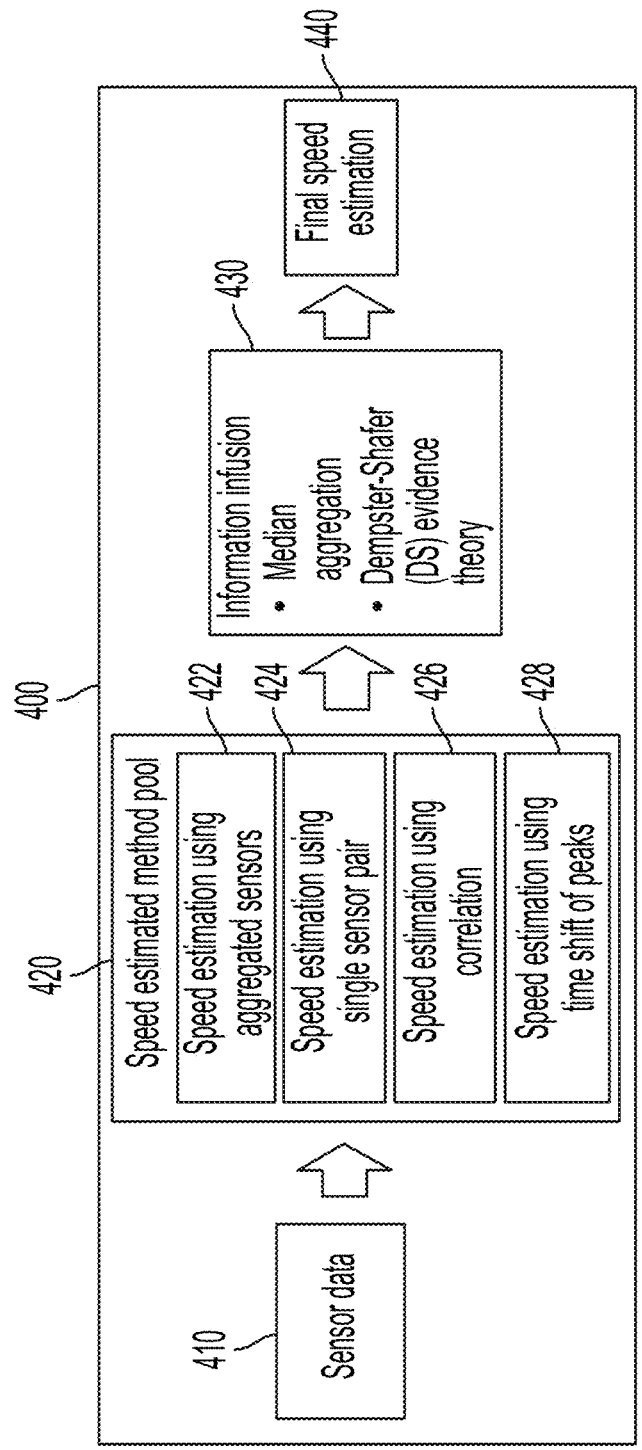
FIG. 4 depicts a system that uses the ensemble method in accordance with embodiments described herein.

Another method to estimate speed is to use the correlation between the time series data from the two fiber lines. An ensemble method is utilized to increase robustness of the method to sensor errors or misalignment of sensor data. FIG. 4 depicts a system 400 that uses the ensemble method in accordance with embodiments described herein. Sensor data 410 is used to estimate speed using one or more of the speed estimation modules 422, 424, 426, 428 of the speed estimation method pool 420. The information infusion module 430 that may use an averaging mechanism (e.g., median and/or mean aggregation). In some implementations, a more sophisticated information infusion method such as Dempster-Shafer rule theory can be utilized to merge the estimations from multiple approaches. The result of the merged estimations results in the final speed estimation 440.

Figure 5:
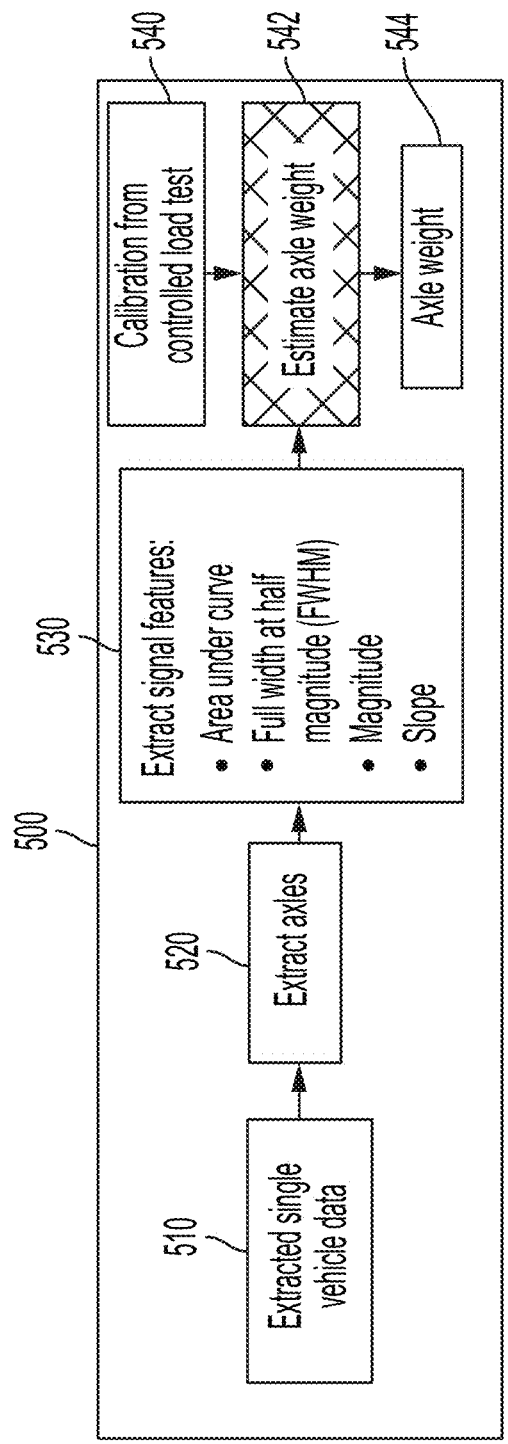
FIG. 5 shows a system for determining various axle attributes is shown in accordance with embodiments described herein.

A system 500 for determining various axle attributes is shown in FIG. 5 in accordance with embodiments described herein. Single vehicle data is extracted 510. A number of axles is extracted 520 by detecting peaks from the sensor data relevant to one vehicle. The extracted axles may be then grouped based on proximity rules. For example, if the distance between two axles is less than a predetermined distance (e.g., 2 m), they can be counted as one axle group. Various signal features may be extracted 530 from the single vehicle data. For example, the signal features may include one or more of an area under a curve, a full width at half magnitude, a magnitude at one or more times, and/or one or more slopes. Axle weight may be extracted 542 from a regression model that takes a set of axle signal features as input, as depicted. According to various embodiments, the regression model may additionally or alternatively use calibration data 540 from a controlled road test as an input. The system 500 may then output the axle weight 544 based on the estimated axle weight 542.

According to various embodiments, vehicle type may be inferred from the estimated vehicle speed and/or axle attributes. In some implementations, a strict rule-based system is utilized to classify vehicles based on vehicle length, number of axles and/or number of axle groups. In some cases, fuzzy logic may be used to classify vehicles based on vehicle length, number of axles and number of axle groups, considering the uncertainties of the estimated axle attributes.

Figure 6A:
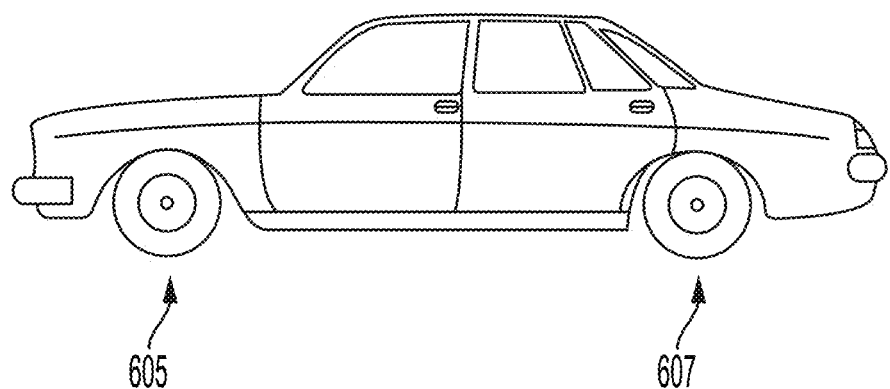
FIGS. 6A-6C illustrates vehicle classification for a small vehicle in accordance with embodiments described herein.
Figure 6B:
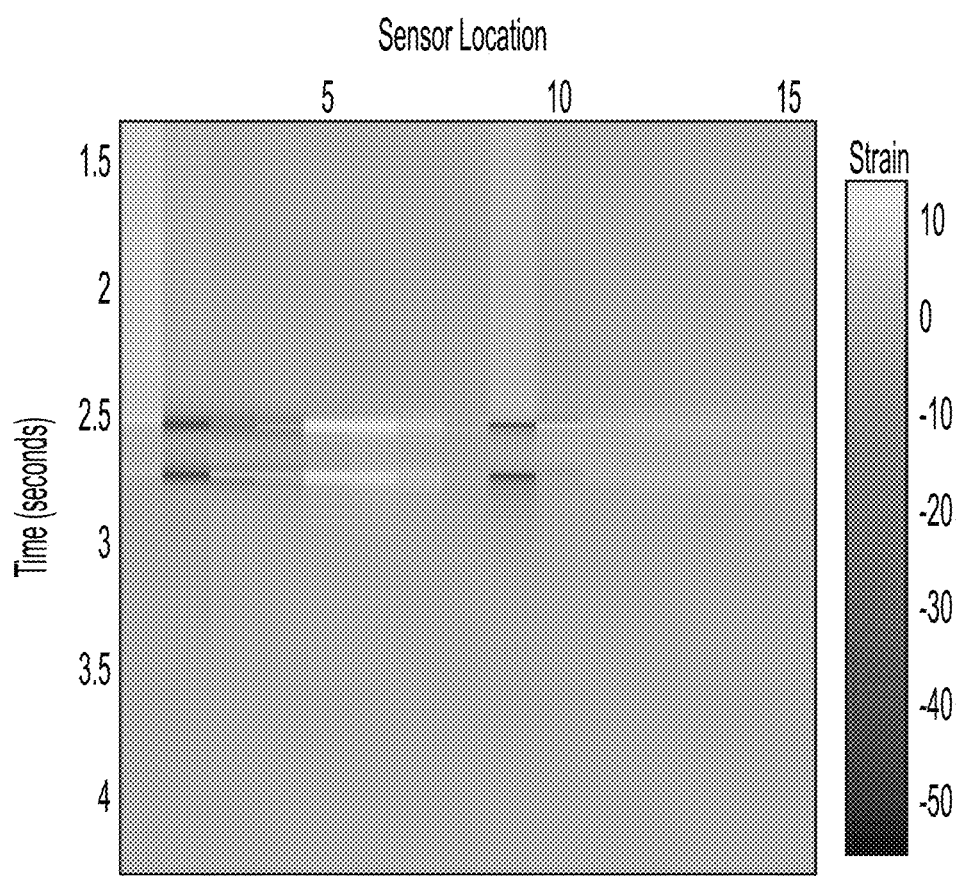
Figure 6C:
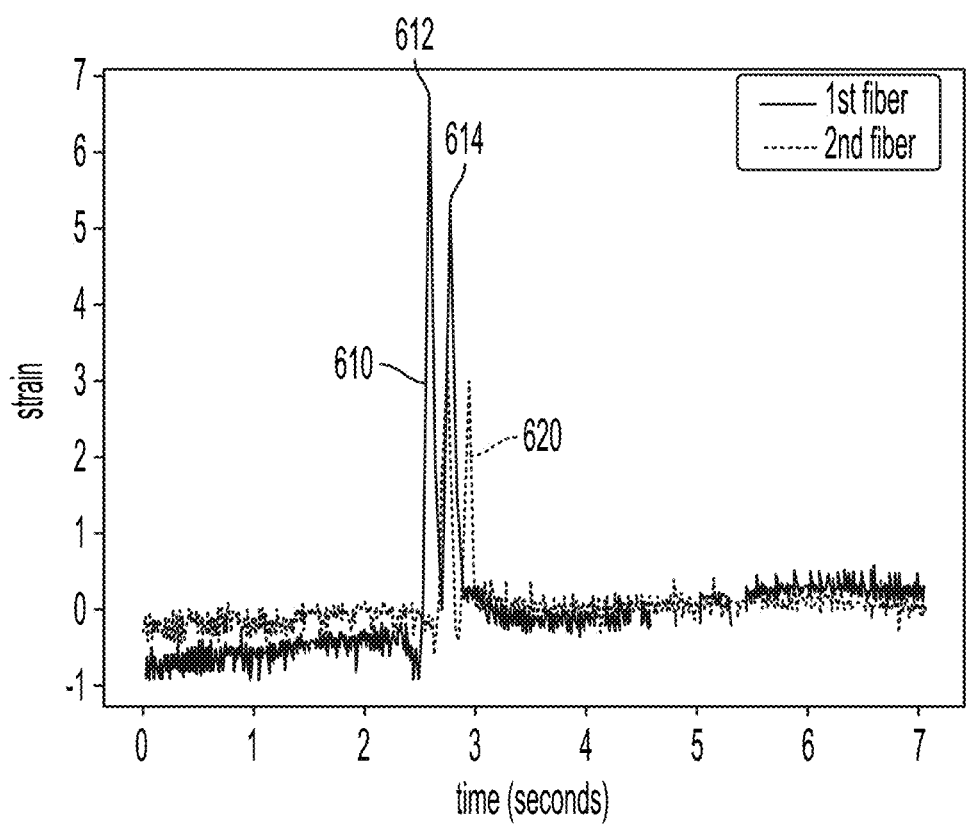

FIGS. 6A-6C illustrates vehicle classification for a small vehicle in accordance with embodiments described herein. An example of a small vehicle is shown in FIG. 6A. FIG. 6B shows a strain heat map for a small vehicle. FIG. 6C illustrates the strain versus time for the first fiber 610 and the second fiber 620. Using the first fiber 610 as an example, it can be observed that there are two strain peaks 612, 614 corresponding to the first axle 605 and the second axle 607, respectively. According to various embodiments described herein, the heat map illustrates an example of a 2D representation of a vehicle. Other types of representations may be used. In some cases, a 3D representation of the vehicle may be created based on the sensor data.

Figure 7A:
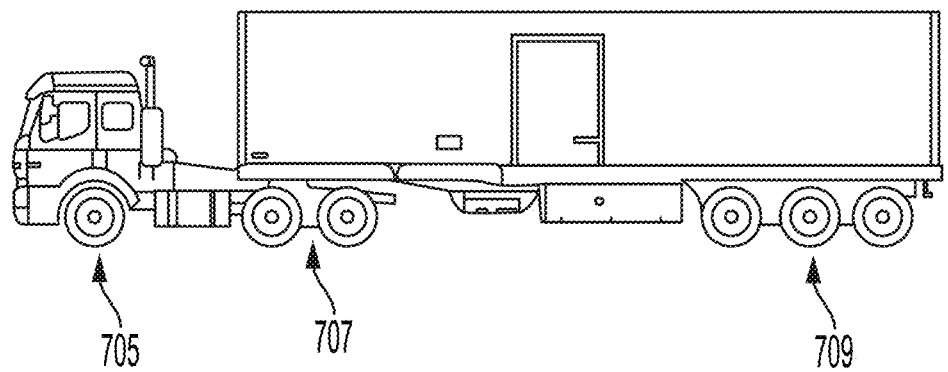
FIGS. 7A-7C illustrates vehicle classification for a six axle vehicle in accordance with embodiments described herein.
Figure 7B:
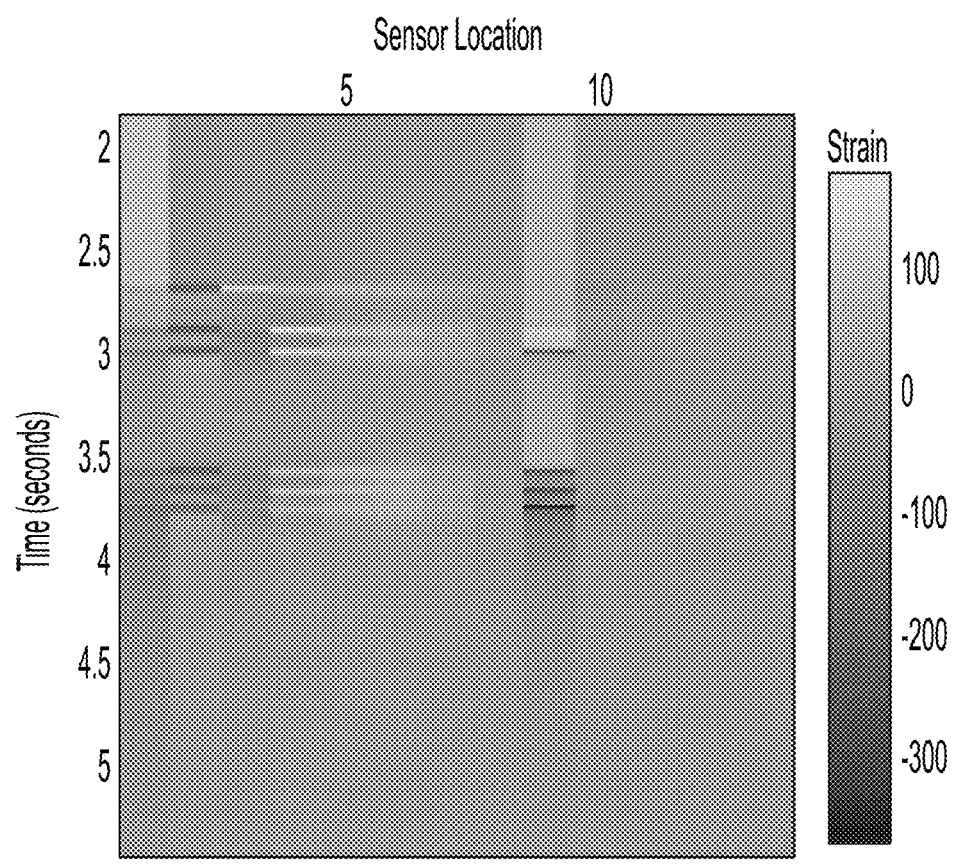
Figure 7C:
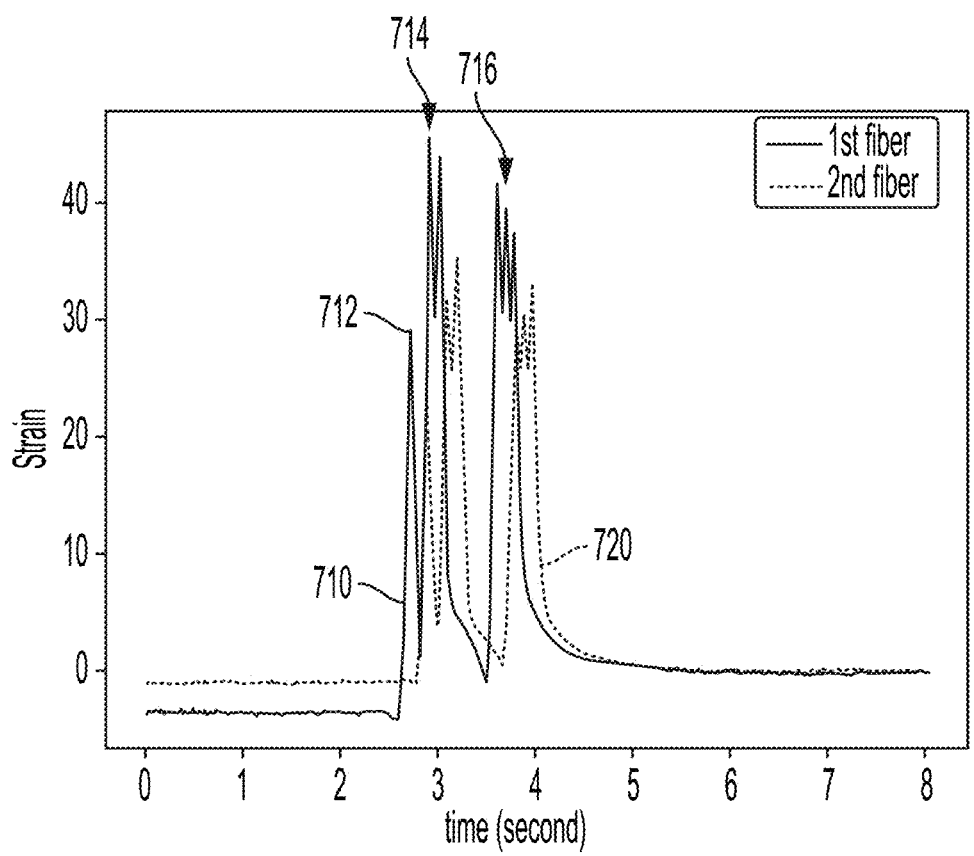

FIGS. 7A-7C illustrates vehicle classification for a six-axle vehicle in accordance with embodiments described herein. An example of a six-axle vehicle is shown in FIG. 7A. FIG. 7B shows a strain heat map for an example six-axle vehicle. FIG. 7C illustrates the strain versus time for the first fiber 710 and the second fiber 720. Using the first fiber 710 as an example, it can be observed that there are three strain peak groups 712, 714, 716. The first strain peak group 712 corresponds to the first axle group 705. The second strain peak group 714 corresponds to the second axle group 707. In this example, the second axle group 707 has two axles and two corresponding peaks in the second strain peak group 714. The third strain peak group 716 corresponds to the third axle group 709. In this example, the third axle group 709 has three axles and three corresponding peaks in the third strain peak group 716.

Figure 8A:
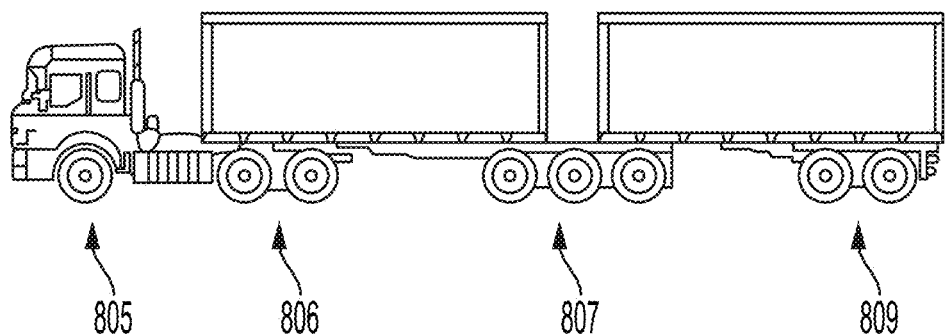
FIGS. 8A-8C illustrates vehicle classification for a larger vehicle in accordance with embodiments described herein.
Figure 8B:
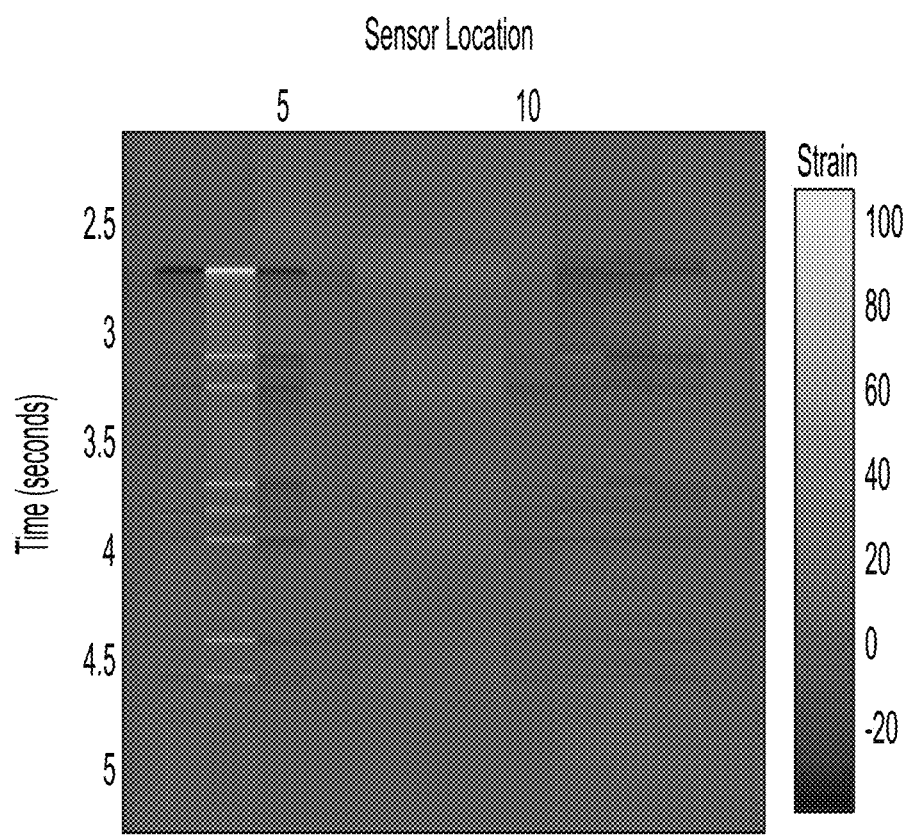
Figure 8C:
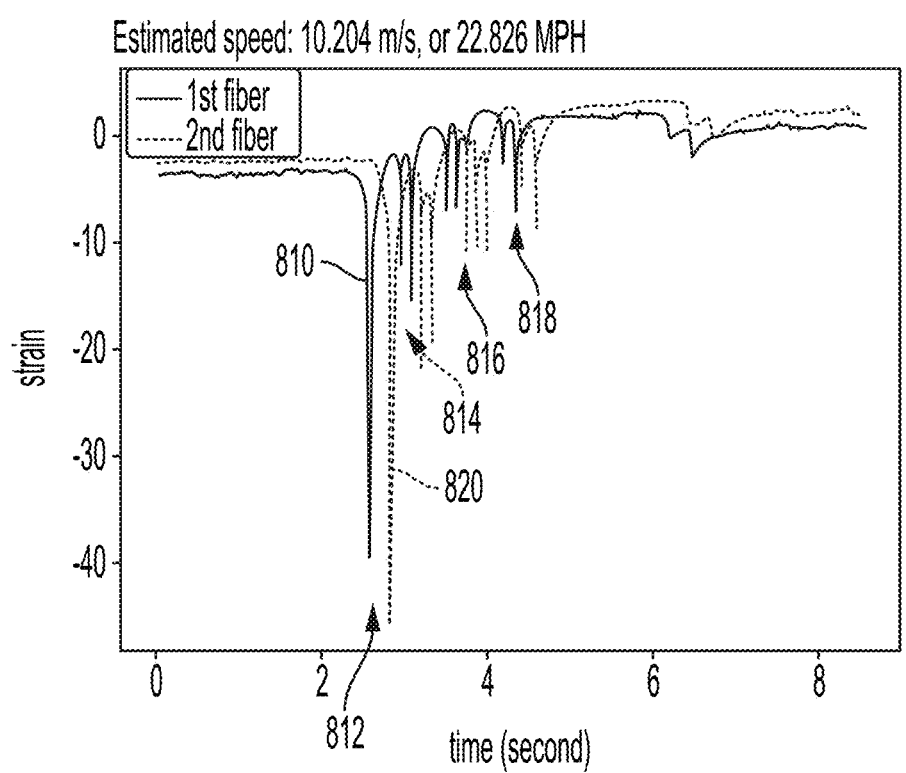

FIGS. 8A-8C illustrates vehicle classification for a larger vehicle in accordance with embodiments described herein. These types of larger vehicles as well as other types of vehicles may be detected using speed estimation, time of flight between fiber lines, and/or other signal features. An example of an eight-axle vehicle is shown in FIG. 8A. FIG. 8B shows a strain heat map for an example six axle vehicle. FIG. 8C illustrates the strain versus time for the first fiber 810 and the second fiber 820. Using the first fiber 810 as an example, it can be observed that there are four strain peak groups 812, 814, 816, 818. The first strain peak group 812 corresponds to the first axle group 805 having a single peak. The second strain peak group 814 corresponds to the second axle group 806. In this example, the second axle group 806 has two axles and two corresponding peaks in the second strain peak group 814. The third strain peak group 816 corresponds to the third axle group 807. In this example, the third axle group 807 has three axles and three corresponding peaks in the third strain peak group 816. The fourth strain peak group 818 corresponds to the fourth axle group 809. In this example, the fourth axle group 809 has two axles and two corresponding peaks in the fourth strain peak group 818.

Figure 9:
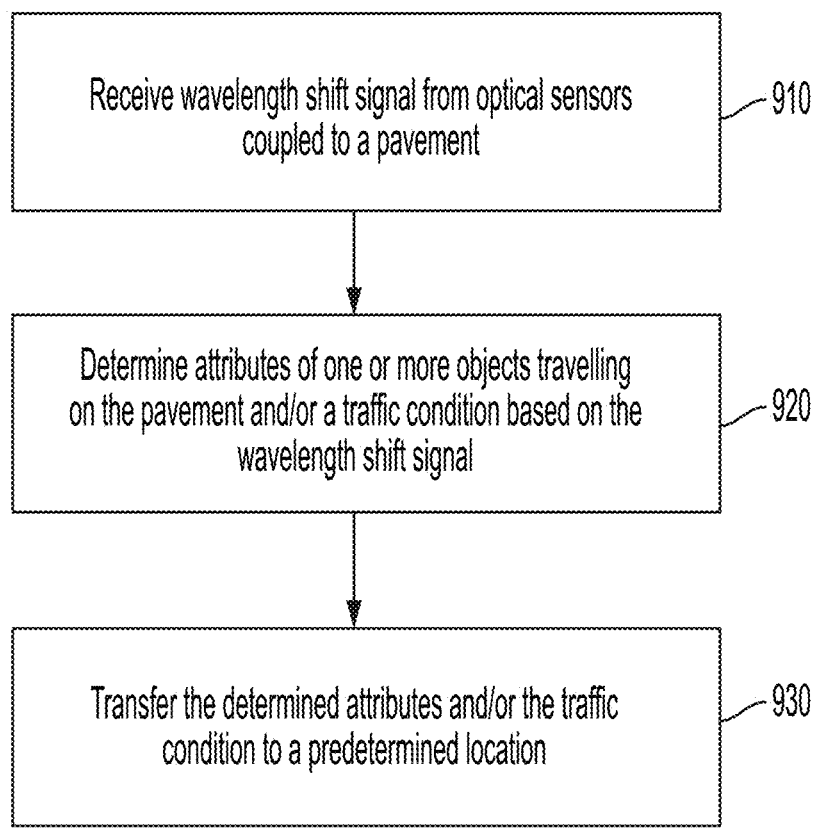
FIG. 9 illustrates a process for monitoring traffic and/or vehicle parameters in accordance with embodiments described herein.

FIG. 9 illustrates a process for monitoring traffic and/or vehicle parameters in accordance with embodiments described herein. A wavelength shift signal is received 910 from a plurality of optical sensors coupled to a pavement. The optical sensors may be disposed on at least two optical fibers. Each optical fiber is disposed a predetermined distance from at least one other optical fiber. The wavelength shift signal may comprise a strain signal. The pavement may include one or more of a walkway, a road, and a bridge.

One or both of one or more attributes of one or more objects travelling on the pavement and a traffic condition are determined 920 based on the one or more wavelength shift values. The objects may include one or more of vehicles and pedestrians. The attributes may comprise one or more of a speed of the one or more objects, direction of travel, a number of axles of the one or more objects, a distance between axles of the one or more objects, a group of axles of the one or more objects, a lane of traffic that the one or more objects are travelling in, a lane straddling condition of the one or more objects and/or a weight per axle for the one or more objects. One or more of the attributes may be aggregated to determine one or more of an object classification, a road occupancy, and a traffic volume of the road. An alert may be issued based on the wavelength shift signal. For example, an alert may be issued if one or more of a determined vehicle classification, weight, and/or speed of a vehicle exceeds the specifications for the type of pavement that it is travelling on.

According to various embodiments, the speed may be determined by aggregating two or more sensors. In some cases, the speed of the one or more objects is determined using a single sensor pair. The speed of the one or more objects may be determined using correlation between a first wavelength shift signal received from sensors disposed on a first optical fiber and a second wavelength shift signal received from sensors disposed on a second optical fiber. In some cases, the speed of the one or more objects is determined using a time shift of wavelength shift peaks of the wavelength shift signal.

One or both of the one or more attributes and the traffic condition may be transferred 930 to a predetermined location. For example, the attributes and/or the traffic condition may be transferred to a database and/or to an operator terminal.

Other types of vehicle and/or traffic attributes may be detected using the systems and methods described herein. For example, lane straddling may be monitored by creating a virtual lane that is centered around the dividing line. For example, in a two-lane road, a virtual lane is created that includes of about half of the sensors from both lanes.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A system, comprising:
   a sensor network comprising at least two optical fibers coupled to a pavement, each optical fiber comprising one or more optical sensors installed a predetermined distance from one or more adjacent optical fibers, the one or more optical sensors configured to produce a wavelength shift signal;
   a processor configured to:
      determine one or both of one or more attributes of one or more objects travelling on the pavement and a traffic condition of the pavement based on the wavelength shift signal, the one or more attributes comprising a speed of the one or more objects, the speed of the one or more objects determined by:
         aggregating data from two or more of the optical sensors of the one or more optical sensors; and
         determining one or both of a median and a mean of the aggregated data; and
   a transmitter configured to transmit one or both of the one or more attributes and the traffic condition to a predetermined location.

2. The system of claim 1, wherein the processor is further configured to detect one or more of entry and exit of an object from a sensing zone.

3. The system of claim 1, wherein the one or more attributes comprise one or more of a direction of travel, a number of axles of the one or more objects, a distance between axles of the one or more objects, a group of axles of the one or more objects, a lane of traffic that the one or more objects are travelling in, and a weight per axle for the one or more objects.

4. The system of claim 3, wherein the processor is configured to aggregate the one or more attributes to determine one or more of an object classification, a road occupancy, and a traffic volume of the pavement.

5. The system of claim 1, wherein the speed of the one or more objects is determined using a single sensor pair.

6. The system of claim 1, wherein the speed of the one or more objects is determined using correlation between a first wavelength shift signal received from sensors disposed on a first optical fiber and a second wavelength shift signal received from sensors disposed on a second optical fiber.

7. The system of claim 1, wherein the speed of the one or more objects is determined using a time shift of wavelength shift peaks of the wavelength shift signal.

8. The system of claim 1, wherein the at least two optical fibers are installed parallel to each other.

9. The system of claim 1, wherein the processor is further configured to detect lane straddling of the one or more objects based on the wavelength shift signal.

10. The system of claim 1, wherein the processor is further configured to issue an alert based on the wavelength shift signal.

11. The system of claim 1, wherein the one or more objects comprise one or more of vehicles and pedestrians.

12. The system of claim 1, wherein the pavement comprises one or more of a walkway and a road.

13. The system of claim 1, wherein the wavelength shift signal comprises a strain signal.

14. The system of claim 1, wherein the processor is configured to:
   determine the one or both of the one or more attributes of the one or more objects travelling on the pavement based on at least two disparate methods; and
   merge results from the at least two disparate methods.

15. A method, comprising:
receiving a wavelength shift signal from a plurality of optical sensors coupled to a pavement, the plurality of optical sensors disposed on at least two optical fibers, each optical fiber disposed a predetermined distance from at least one other optical fiber;
determining one or both of one or more attributes of one or more objects travelling on the pavement and a traffic condition based on the wavelength shift signal, the one or more attributes comprising a speed of the one or more objects, the speed of the one or more objects determined by:
aggregating data from two or more of the optical sensors of the one or more optical sensors; and
determining one or both of a median and a mean of the aggregated data; and
transferring one or both of the one or more attributes and the traffic condition to a predetermined location.

16. The method of claim 15, further comprising detecting one or more of entry and exit of an object from a sensing zone.

17. The method of claim 15, wherein the one or more attributes comprise one or more of a direction of travel, a number of axles of the one or more objects, a distance between axles of the one or more objects, a group of axles of the one or more objects, a lane of traffic that the one or more objects are travelling in, and a weight per axle for the one or more objects.

18. The method of claim 17, further comprising aggregating the one or more attributes to determine one or more of an object classification, a road occupancy, and a traffic volume of the pavement.

19. The method of claim 17, further comprising determining the speed of the one or more objects using correlation between a first wavelength shift signal received from sensors disposed on a first optical fiber and a second wavelength shift signal received from sensors disposed on a second optical fiber.

20. The method of claim 17, further comprising determining the speed of the one or more objects using a time shift of wavelength shift peaks of the wavelength shift signal.

* * * * *